(12) United States Patent
Imaoku et al.

(10) Patent No.: US 9,122,002 B2
(45) Date of Patent: Sep. 1, 2015

(54) TABULAR MEMBER AND STRUCTURE WITH OBSERVATION PORT

(75) Inventors: Takao Imaoku, Osaka (JP); Akinobu Isurugi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 778 days.

(21) Appl. No.: 13/384,801

(22) PCT Filed: Mar. 24, 2010

(86) PCT No.: PCT/JP2010/055120
§ 371 (c)(1),
(2), (4) Date: Jan. 19, 2012

(87) PCT Pub. No.: WO2011/016270
PCT Pub. Date: Feb. 10, 2011

(65) Prior Publication Data
US 2012/0170126 A1    Jul. 5, 2012

(30) Foreign Application Priority Data
Aug. 5, 2009  (JP) ................ 2009-182776

(51) Int. Cl.
G02B 27/00     (2006.01)
G02B 1/118     (2015.01)
G02F 1/1335    (2006.01)

(52) U.S. Cl.
CPC .......... *G02B 1/118* (2013.01); *G02F 1/133502* (2013.01)

(58) Field of Classification Search
CPC ............ G02B 1/118; G02B 1/10; G02B 1/11; G02B 5/02; G02B 5/0215–5/0221; G02B 5/0278; G02B 5/0294
USPC ................. 359/599, 601, 613, 614, 580–581; 349/112, 137; 348/834; 362/606–607, 362/617–62
See application file for complete search history.

(56) References Cited

U.S. PATENT DOCUMENTS 8,810,910 B2 *   8/2014  Endoh et al. ............... 359/581
2010/0328776 A1*  12/2010  Sanari et al. ............... 359/601
2012/0127580 A1   5/2012  Okamoto

FOREIGN PATENT DOCUMENTS

JP     2002323860 A     11/2002
JP     2002333502 A     11/2002
(Continued)

OTHER PUBLICATIONS

International Search Report.

*Primary Examiner* — Stephone B Allen
*Assistant Examiner* — James McGee
(74) *Attorney, Agent, or Firm* — Harness, Dickey & Pierce, P.L.C.

(57) ABSTRACT

Disclosed is a tabular member that has an excellent low reflectivity and that can reduce coloring due to reflected light. In at least one example embodiment, specifically disclosed is a tabular member which comprises a base, a first antireflective film disposed on a surface of the base, and a second antireflective film disposed on the other surface of the base. The first and second antireflective films each have a plurality of projections on the surface thereof, and the distances between the apexes of two adjacent projections are shorter than or equal to the wavelength of visible light. The light obtained by combining the light reflected from the surface of the first antireflective film and the light reflected from the surface of the second antireflective film together has flat wavelength dispersion within the range of visible light.

22 Claims, 8 Drawing Sheets

(56) References Cited

FOREIGN PATENT DOCUMENTS

| | | |
|---|---|---|
| JP | 2003-090902 | 3/2003 |
| JP | 2003222701 A | 8/2003 |
| JP | 2004205990 A | 7/2004 |
| JP | 200562674 A | 3/2005 |
| JP | 2007-283581 | 11/2007 |
| JP | 200832804 A | 2/2008 |
| WO | WO 2009044578 A1 * | 4/2009 |
| WO | WO 2009107871 A1 * | 9/2009 |
| WO | WO 2010/150514 | 12/2010 |

* cited by examiner

Refractive index

TABULAR MEMBER AND STRUCTURE WITH OBSERVATION PORT

TECHNICAL FIELD

The present invention relates to a tabular member and a structure with an observation port. The present invention specifically relates to a tabular member suitably used as a protecting plate for the surfaces of structures with an observation port, such as digital signage devices and mobile devices, and a structure with an observation port, such as digital signage devices and mobile devices, which has a tabular member capable of serving as a protecting plate on its surface.

BACKGROUND ART

Displays such as cathode-ray tube (CRT) displays, liquid crystal displays (LCDs), plasma display panels (PDPs), and electroluminescence (EL) displays are required to have various functions of preventing scratch damages, preventing reflection of images, and preventing fouling, on their surfaces.

Thus, the surface of a common display is provided with a protecting plate or an optical filter having functions such as an anti-reflection property, antiglare property, hard coating property, antistatic property, anti-fouling property, gas barrier property, and UV (ultraviolet rays) shielding property (see Patent Document 1, for example). Patent Document 1 discloses an optical filter comprising a near infrared radiation reflective layer including a transparent high-refractive-index thin-film layer and a metal thin-film layer for the purpose of shielding near infrared rays and electromagnetic waves radiated from the screens of displays such as plasma display panels, and an optical filter further comprising a commercially available anti-reflection film laminated thereon and thereby being imparted with anti-reflection and anti-glare properties.

Examples of common anti-reflection films include AR (anti-reflection) films and LR (low reflection) films in which the surface of a substrate is covered with a film having a refractive index different from that of the substrate, and reflection is reduced owing to the interference effect between light reflected from the substrate surface and light reflected from the surface of the applied film. Further, examples of common anti-glare films include AG (anti-glare) films in which the substrate surface is covered with a film having a fine uneven pattern, and thus reflection of images is prevented owing to the light scattering effect.

Such an anti-reflection film, however, has a high absolute value of the reflectance and strong wavelength dependence, and thus reflection of the surroundings and coloring due to reflected light occur. Therefore, the film can be further improved in these respects.

In contrast, a moth-eye structure is being focused on as a technique for improving visibility at bright sites different from the above films. The moth-eye structure can provide an ultra-anti-reflection effect without light interference. The moth-eye structure is a structure that a fine uneven pattern at a pitch of not greater than the visible light wavelength (for example, 400 nm or lower), which is finer than the uneven pattern formed on an AG film, is arranged without any gap on the surface of an article to be anti-reflection-treated, and thereby the refractive index at the boundary between the outside (air) and the article surface pseudo-continuously changes. Thereby, most part of light is transmitted regardless of the refractive index interface, and light reflection from the article surface can be almost perfectly prevented (see Patent Document 2, for example).

Patent Document 1: JP 2002-323860 A
Patent Document 2: JP 2004-205990 A

SUMMARY OF THE INVENTION

Problems to be Solved by the Invention

The following will describe one example in which an anti-reflection film is placed on a substrate. FIG. 17 and FIG. 18 each are a schematic cross-sectional view showing one example of a tabular member formed by placing an anti-reflection film on a substrate. FIG. 17 shows the case where an AR film or an LR film is placed on a substrate, and FIG. 18 shows the case where a film having a moth-eye structure on its surface (hereinafter, also referred to as a moth-eye film) is placed on a substrate. Attachment of the AR film or LR film 112, or the moth-eye film 113 on the surface of the substrate 111 as shown in FIG. 17 and FIG. 18 reduces reflection of light from the surface of the substrate 111.

The AR film or LR film 112 shown in FIG. 17, however, is less likely to achieve an anti-glare property and has an insufficiently reduced reflectance, although it has high surface durability. Further, light reflected from these films has wavelength dependence, so that coloring due to reflected light may disadvantageously occur. In particular, LR films are designed to primarily reduce the reflectance observed from the front direction. Thus, LR films have particularly high viewing-angle dependence and cause regular reflection of most part of light from oblique directions.

On the other hand, the moth-eye film 113 shown in FIG. 18 allows most part of light to pass through the surface of the substrate 111. Thus, an excellently low reflectance can be achieved. In addition, light reflected from the film has very low viewing-angle dependence, so that coloring less occurs. The moth-eye film 113, however, has an uneven structure on its surface and may not achieve sufficient surface durability depending on the shape or size of each protruding portion.

FIG. 19 is a graph of reflection spectra wherein the reflectances of the AR film, LR film, and moth-eye film are compared. As shown in FIG. 19, the moth-eye film has a better reflectance and wavelength dependence of the reflectance than the AR film and LR film.

The present invention is devised in consideration of the aforementioned situations, and an object of the present invention is to provide a tabular member which has an excellent low-reflection property and which is less likely to be colored due to reflected light.

Means for Solving the Problems

The present inventors have performed various studies in order to figure out good means to achieve a better low-reflection property on the substrate surface, and thereby focused on placement of a moth-eye film not only on the front face of the substrate but also on the back face of the substrate. In the case that the substrate with the above film placed thereon is used as a protecting plate disposed on the forefront of the display, for example, an air layer is formed between the display panel and the protecting plate, in general. In this case, a refractive index interface is also formed between the backside face of the protecting plate (the side opposite to the outside) and the air layer, and reflection due to the difference between these refractive indexes may occur.

FIG. 20 is a schematic cross-sectional view showing one example of a tabular member formed by placing a moth-eye film on each face of the substrate. Even in the case that the interface of the refractive index difference occurs on each face of the substrate, attachment of the moth-eye films 12 and 13 on the respective faces of the substrate 11 as shown in FIG. 20 prevents reflection from both faces of the substrate 11. Thus, the reflectance of light can be more greatly reduced than in the case that the moth-eye film 12 or 13 is attached on one face of the substrate 11.

The present inventors have then performed various studies on means for providing surface durability to moth-eye films, and thus focused on the size of each protruding portion of the moth-eye structure. As a result, the present inventors have found that reduction in the height of each protruding portion of the moth-eye structure enables to increase the surface durability and, if the height of each protruding portion is excessively lowered for the purpose of increasing the surface durability, part of the wavelength components of light incident on the moth-eye film is reflected from the surface of the moth-eye film.

The present inventors have further found that coloring due to reflection of part of the wavelength components from such a moth-eye film more occurs in the case of attaching the film on each face of the substrate than in the case of attaching it only on one face of the substrate.

The present inventors have then performed various studies on means for solving coloring of reflected light occurring in the case of excessively reducing the height of each protruding portion of the moth-eye film, and focused on a moth-eye film disposed on the backside of the substrate for the purpose of achieving better low-reflection property.

As a result, the present inventors have found that the problem of coloring due to reflected light can be solved by not placing those having the same wavelength dispersion characteristics but placing those having different wavelength dispersion characteristics, as a moth-eye film disposed on one face of the substrate and a moth-eye film disposed on the other face of the substrate; controlling the wavelength dispersion characteristics of the moth-eye film disposed on the one face of the substrate and the wavelength dispersion characteristics of the moth-eye film disposed on the other face of the substrate to be complementary to each other, and allowing the respective films to counteract the wavelength dispersion characteristics each other so as to achieve a flat wavelength dispersion characteristic if the visible light wavelength range is seen as a whole. Thereby, the present inventors have arrived at the solution of the above problems, and completed the present invention.

In other words, the present invention relates to a tabular member comprising a substrate, a first anti-reflection film placed on one face of the substrate, and a second anti-reflection film placed on the other face of the substrate, wherein the first anti-reflection film and the second anti-reflection film each comprise multiple protruding portions on their surfaces; a width between apexes of adjacent protruding portions is not greater than a visible light wavelength; and light obtainable by combining light reflected from the surface of the first anti-reflection film and light reflected from the surface of the second anti-reflection film has flat wavelength dispersion within a visible light range.

The present inventors have further performed studies on means for controlling wavelength dispersion as mentioned above, and focused on the height and aspect ratio (value obtained by dividing height by pitch) of each protruding portion of the moth-eye structure. Then, the present inventors have found that adjustment of the conditions of the height and/or aspect ratio of each protruding portion enables to change wavelength components which cause reflection and the reflectance thereof.

For example, the studies by the present inventors have made it clear that if the height or aspect ratio of each protruding portion is small, the long-wavelength reflection components increase and red coloring occurs and, on the other hand, if the height or aspect ratio of each protruding portion is great, short-wavelength reflection components increase and blue coloring occurs, in some cases.

Considering these studies, the present inventors have found that high transmissivity can be achieved, surface durability can be obtained, and coloring of reflected light can be solved by disposing a moth-eye film with a lower height on the outside surface of a tabular member disposed as a protecting plate or the like on the front face of a structure with an observation port, and disposing a moth-eye film with a higher height on the surface of the other side (inner side of the structure with an observation port) of the tabular member. Thereby, the present inventors have arrived at the solution of the above problems, and completed the present invention.

In other words, the present invention also relates to a structure with an observation port comprising, on its front face, a tabular member comprising a substrate, a first anti-reflection film placed on one face of the substrate, and a second anti-reflection film placed on the other face of the substrate, wherein the first anti-reflection film and the second anti-reflection film each comprise multiple protruding portions on their surfaces; a width between apexes of adjacent protruding portions is not greater than a visible light wavelength; the first anti-reflection film is disposed on an outer side of the tabular member and the second anti-reflection film is disposed on the other side of the tabular member; and each of the protruding portions of the first anti-reflection film is lower than each of the protruding portions of the second anti-reflection film (hereinafter, this structure is also referred to as the first structure with an observation port of the present invention).

The present inventors have further found that an increase of reflection due to the presence of the interface between different refractive indexes inside a structure with an observation port can be prevented by disposing a moth-eye film even on the internal structure of the structure with an observation port in addition to the tabular member constituting the front face of the structure with an observation port. Then, the present inventors have found that coloring due to reflected light can be solved by disposing multiple moth-eye films having different wavelength dispersion characteristics, similarly to the tabular member of the present invention, and allowing the moth-eye films to counteract the wavelength dispersion characteristics each other, and achieving a flat wavelength dispersion characteristic in the case that the visible light wavelength range is observed as a whole. As a result, the present inventors have arrived at the solution of the problems, and completed the present invention.

In other words, the present invention also relates to a structure with an observation port comprising: a tabular member on its front face; and one or more inner anti-reflection films at an inner position than the tabular member, wherein the tabular member comprises a substrate, a first anti-reflection film placed on one face of the substrate, and a second anti-reflection film placed on the other face of the substrate; the first anti-reflection film, the second anti-reflection film, and the one or more inner anti-reflection films each comprise multiple protruding portions on their surfaces; a width between apexes of adjacent protruding portions is not greater than a visible light wavelength; the first anti-reflection film is disposed on an outer side of the tabular member and the second anti-reflection film is disposed on the other side of the tabular member; and light obtainable by combining light reflected from a surface of the first anti-reflection film, light reflected from a surface of the second anti-reflection film, and light reflected from a surface of the one or more inner anti-reflection films has flat wavelength dispersion within a visible light range (this structure is also referred to as the second structure with an observation port of the present invention).

First, the tabular member of the present invention will be described in detail.

The tabular member of the present invention comprises a substrate, a first anti-reflection film placed on one face of the substrate, and a second anti-reflection film placed on the other face of the substrate. Further, the first anti-reflection film and the second anti-reflection film each have multiple protruding portions on their surfaces. The width between apexes of adjacent protruding portions is not greater than the visible light wavelength. The expression "not greater than a visible light wavelength" herein specifically means 380 nm or shorter. In other words, the tabular member of the present invention has a moth-eye film on each face. Thus, a drastic change in the refractive index at the interface between the substrate and the air layer can be solved, and most part of the light incident on the substrate passes through the substrate, so that an excellent reflection-preventing effect can be achieved.

In the tabular member of the present invention, light obtainable by combining the light reflected from the surface of the first anti-reflection film and the light reflected from the surface of the second anti-reflection film has flat wavelength dispersion within the visible light range. The expression "visible light range" herein means a wavelength range of 380 to 780 nm. In the tabular member of the present invention, the wavelength dispersion characteristic of the light reflected from the surface of the first anti-reflection film and the wavelength dispersion characteristic of the light reflected from the surface of the second anti-reflection film are made to counteract each other, so that the reflected light in total has even (flat) wavelength dispersion. Thereby, for example, in the case of using the tabular member as a protecting plate disposed on a display panel, coloring in the screen due to the light reflected from the surface of the tabular member can be suppressed, and the display quality is improved.

The expression "have flat wavelength dispersion within the visible light range" herein means that the change rate in reflectance based on the tabular member within a wavelength range of 380 to 780 nm is lower than 0.5% around the reflectance at a wavelength of 550 nm. The change rate in the reflectance is preferably lower than 0.2% within the visible light range, and more preferably lower than 0.1% within the visible light range. Thereby, the effect of suppressing coloring is extremely improved.

As mentioned above, the tabular member of the present invention solves the following problem by devising the structure of the moth-eye film itself placed on each face. Here, the problem is that disturbance in the wavelength dispersion characteristics newly becomes large in the case that a moth-eye film is placed on each face of the substrate in order to improve the transmissivity in comparison with the case where a moth-eye film is placed on only one face of the substrate.

The configuration of the tabular member of the present invention is not especially limited by other components as long as it essentially includes such components.

Next, the first structure with an observation port of the present invention will be described in detail.

The first structure with an observation port of the present invention comprises a tabular member on its front face, and the tabular member comprises a substrate, a first anti-reflection film placed on one face of the substrate, and a second anti-reflection film placed on the other face of the substrate. In other words, the tabular member can be used as a front plate of the structure with an observation port, and preferably has translucency so that the inside can be observed from the outside.

The first anti-reflection film and the second anti-reflection film each have multiple protruding portions on their surfaces, and the width between the apexes of adjacent protruding portions is not greater than the visible light wavelength. In the same manner as in the tabular member of the present invention, the first anti-reflection film and the second anti-reflection film are moth-eye films, and the specific features thereof are the same as mentioned above.

The first anti-reflection film is disposed on the outside of the tabular member, and the second anti-reflection film is disposed on the other side of the tabular member. Each of the protruding portions of the first anti-reflection film is lower than each of the protruding portions of the second anti-reflection film. In order to reduce coloring due to reflected light, the moth-eye films disposed on the respective faces of the tabular member preferably have different wavelength dispersion characteristics. Further, the moth-eye film disposed on the inner face of the structure with an observation port among both faces of the tabular member does not require surface durability. Thus, with respect to the allocation of the moth-eye films, preferably, a moth-eye film in which each protruding portion is lower is disposed on the outside and a moth-eye film in which each protruding portion is higher is disposed on the inner side of the structure with an observation port.

Further, combination of these moth-eye films enables to control the wavelength dispersion of reflected light to be flat as a whole. With respect to the spectrum of reflected light occurring at the interface between the tabular member provided with the moth-eye films and the air, the same tendency is shown by light incident from the tabular member side and light incident from the air side.

As mentioned above, the first structure with an observation port of the present invention solves the problem by devising the structure of the moth-eye film itself placed on each face. Here, the problem is that the disturbance of the wavelength dispersion characteristics newly becomes large in the case of placing a moth-eye film on each face of the substrate in order to improve the transmissivity of the tabular member used as a front plate. According to the first structure with an observation port of the present invention, coloring based on the light reflected from the surface of the tabular member can be suppressed and the display quality is improved.

Next, the second structure with an observation port of the present invention will be described in detail.

The second structure with an observation port of the present invention comprises a tabular member on its front face, and one or more inner anti-reflection films at an inner portion than the tabular member. The tabular member comprises a substrate, a first anti-reflection film placed on one face of the substrate, and a second anti-reflection film placed on the other face of the substrate. In other words, in the second structure with an observation port of the present invention, an anti-reflection film is disposed not only to the tabular member but also to an inner structure. As a result, reflection can be prevented not only at the surface of the tabular member but also at the interface between different refractive indexes in the internal structure.

The first anti-reflection film, the second anti-reflection film, and the one or more inner anti-reflection films each have multiple protruding portions on their surfaces, and the width between the apexes of adjacent protruding portions is not greater than the visible light wavelength. Similar to the aforementioned case of the tabular member of the present invention, the first anti-reflection film and the second anti-reflection film each are a moth-eye film, and the one or more inner anti-reflection films each are a moth-eye film. The specific properties thereof are the same as mentioned above.

The first anti-reflection film is disposed on the outside of the tabular member, and the second anti-reflection film is disposed on the other side of the tabular member. Thus, reflection can be prevented at both faces of the tabular member.

Light obtainable by combining light reflected from the surface of the first anti-reflection film, light reflected from the surface of the second anti-reflection film, and light reflected from the surface of the one or more inner anti-reflection films, has flat wavelength dispersion within the visible light range. Thus, reflection can be prevented at both faces of the tabular member and at the interface between different refractive indexes existing in the internal structure. In addition, disturbances of the wavelength dispersions of the moth-eye films are counteracted by each other, and thereby coloring of reflected light in total can be suppressed.

As mentioned above, the second structure with an observation port of the present invention solves the following problem by controlling the wavelength dispersion characteristics of the moth-eye films placed on the respective faces and those of the moth-eye film disposed in the internal structure, thereby solving disturbance of the wavelength dispersion of reflected light as a whole. Here, the problem is that disturbance of the wavelength dispersion characteristics increases as a whole in the case of disposing a moth-eye film not only to the tabular member used as a front plate but also in the internal structure. According to the second structure with an observation port of the present invention, coloring due to reflected light can be suppressed, and the display quality is improved.

The configurations of the first and second structures with an observation port of the present invention are not especially limited by other components as long as they essentially include these components.

Preferable modes of the tabular member of the present invention and the first and second structures with an observation port of the present invention are mentioned in more detail below.

In the tabular member of the present invention, each of the protruding portions of the first anti-reflection film is preferably lower than each of the protruding portions of the second anti-reflection film. Thereby, the wavelength dispersion characteristic of the first anti-reflection film and the wavelength dispersion characteristic of the second anti-reflection film easily counteract each other, and coloring due to light reflected from the tabular member is likely to be suppressed.

In the first structure with an observation port of the present invention, light obtainable by combining light reflected from the surface of the first anti-reflection film and light reflected from the surface of the second anti-reflection film preferably has flat wavelength dispersion within the visible light range. Thereby, coloring due to light reflected from the tabular member can be suppressed.

Preferably, the first structure with an observation port of the present invention has one or more inner anti-reflection films at an inner position than the tabular member, wherein the films have multiple protruding portions on their surfaces, the width between the apexes of adjacent protruding portions are not greater than the visible light wavelength, and light obtainable by combining light reflected from the surface of the first anti-reflection film, light reflected from the surface of the second anti-reflection film, and light reflected from the surface of the one or more inner anti-reflection films has flat wavelength dispersion within the visible light range. Thereby, an increase in reflection due to the presence of an interface between different refractive indexes in the internal structure is prevented, disturbances of the wavelength dispersions of the moth-eye films are counteracted by each other, and coloring of reflected light can be suppressed.

In the second structure with an observation port of the present invention, each of the protruding portions of the first anti-reflection film is preferably lower than each of the protruding portions of the second anti-reflection film. Thereby, a structure with an observation port with higher surface durability can be obtained.

The following will describe common preferable modes of the tabular member of the present invention, the first structure with an observation port of the present invention, and the second structure with an observation port of the present invention, in detail.

The height of each protruding portion of the first anti-reflection film is preferably 100 nm or higher, and it is preferably lower than 200 nm. The height is more preferably 100 nm or higher and lower than 200 nm. A height of 200 nm or higher tends to cause poor surface durability. In contrast, a height of lower than 100 nm may cause a higher reflectance of part of the reflection components.

The aspect ratio of each protruding portion of the first anti-reflection film is preferably 0.5 or greater, and it is preferably smaller than 1. The aspect ratio is more preferably 0.5 or greater and smaller than 1. An aspect ratio of 1 or greater tends to cause poor surface durability. In contrast, an aspect ratio of smaller than 0.5 may cause part of the reflection components to have a higher reflectance.

Further preferably, the height of each protruding portion of the first anti-reflection film is 100 nm or higher and lower than 200 nm, and the aspect ratio of each protruding portion of the first anti-reflection film is 0.5 or greater and smaller than 1.

The height of each protruding portion of the second anti-reflection film is preferably 200 nm or higher, and it is preferably lower than 400 nm. The height is more preferably 200 nm or higher and lower than 400 nm. Thereby, even though each protruding portion of the first anti-reflection film is formed with a low height in order to achieve surface durability, the wavelength dispersion characteristic of the whole reflected light on the tabular member can be easily made close to flat. In contrast, a height of 400 nm or higher may cause a higher reflectance of part of the reflection components.

The aspect ratio of each protruding portion of the second anti-reflection film is preferably 1 or greater, and it is preferably smaller than 2. The aspect ratio is more preferably 1 or greater and smaller than 2. Thereby, even though each protruding portion of the first anti-reflection film is formed with a low height in order to achieve surface durability, the wavelength dispersion characteristic of the whole reflected light on the tabular member can be easily made closed to flat. An aspect ratio of 0.5 or greater may cause a higher reflectance of part of the reflection components.

Further preferably, the height of each protruding portion of the second anti-reflection film is 200 nm or higher and lower than 400 nm, and the aspect ratio of each protruding portion of the second anti-reflection film is 1 or greater and smaller than 2.

Effects of the Invention

The tabular member of the present invention enables to achieve high transmissivity and to solve inconsistence in wavelength dispersion of reflected light. For example, use of the tabular member of the present invention as a protecting plate disposed on a display panel enables to suppress coloring in the display screen due to light reflected on the tabular member, and thus the display quality of the display panel can be improved.

MODES FOR CARRYING OUT THE INVENTION

Figure 1:
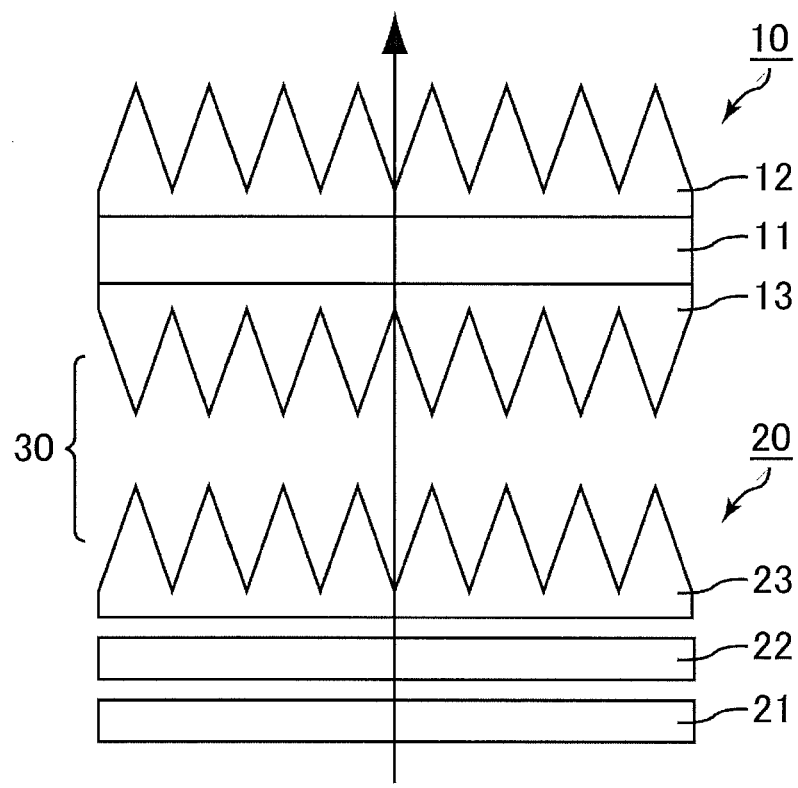
FIG. 1 is a schematic cross-sectional view of a structure with an observation port of Embodiment 1.

The present invention will be mentioned in more detail referring to the drawings in the following embodiments, but is not limited to these embodiments.

Embodiment 1

Embodiment 1 is one example of the tabular member of the present invention and the first and second structures with an observation port of the present invention. The structure with an observation port of Embodiment 1 is not particularly limited as long as it is a structure whose inside is observable from the outside, such as display media including liquid crystal displays, organic electroluminescence displays, plasma displays, and cathode-ray tube displays, advertising media including shop windows, appreciation media including aquarium, and other show cases and windowpanes. Further, the tabular member of Embodiment 1 may be used as a front plate, protecting plate, lens, window, and the like for the structure with an observation port.

FIG. 1 is a schematic cross-sectional view of the structure with an observation port of Embodiment 1. As shown in FIG. 1, the structure with an observation port of Embodiment 1 includes a tabular member 10 for protecting the front face of a display body 20, for example. The tabular member 10 is disposed apart from the display body 20 by a predetermined distance with an air layer 30 therebetween.

An image displayed on the display body 20 is observable by a human eye through the tabular member. Examples of the display body include a liquid crystal display panel 21 comprising a pair of substrates and a liquid crystal layer disposed between the substrates, and a polarizer 22 disposed on the surface of the liquid crystal display panel 21.

A material of the substrate 11 of the tabular member 10 preferably has translucency and stiffness. Examples thereof include glass, acryl resin, and methacryl resin.

The tabular member 10 in Embodiment 1 is a laminate comprising a substrate 11 and two moth-eye films 12 and 13 placed on the respective faces of the substrate 11. One of these two moth-eye films 12 and 13 is an outside moth-eye film (first anti-reflection film) 12 placed on the outside surface of the substrate 11, and the other is an inside moth-eye film (second anti-reflection film) 13 placed on the surface of the display body 20 side of the substrate 11.

The outside moth-eye film 12 reduces reflection between the outside air layer and the tabular member 10, and the inside moth-eye film 13 reduces reflection between the air layer 30 in the structure with an observation port and the tabular member 10. A moth-eye film 23 is further disposed on the surface of the display body 20, and reduces reflection from the interface between the air layer 30 of the structure with an observation port and the display body 20.

Each of the moth-eye films 12, 13, and 23 comprises multiple protruding portions on their surfaces, and the width (pitch) between the apexes of adjacent protruding portions is not greater than the visible light wavelength. Further, each of the moth-eye films 12, 13, and 23 can be produced from the same material. Examples of the material of the moth-eye films 12, 13, and 23 include resin which show curability under predetermined conditions and thus can be used in photo-nanoimprinting and thermo-nanoimprinting. Particularly preferable are photo-curable resins which can be used in photo-nanoimprinting wherein precision patterning is performed, such as acrylate resin and methacrylate resin.

As mentioned below, the two moth-eye films 12 and 13 of the tabular member 11 counteract the wavelength dispersion characteristics each other, and thus their shapes may be selected from various shapes. In order to suppress coloring, the moth-eye film 23 disposed on the display body 20 (on the polarizer 22) preferably has a shape such that reflected light is allowed to have an even (flat) wavelength dispersion characteristic.

In Embodiment 1, light obtainable by combining the light beams reflected from the respective surfaces of all the moth-eye films 12, 13, and 23 may be adjusted to form an even (flat) wavelength dispersion characteristic within the visible light range. In this case, light obtainable by combining the light beams reflected from the respective surfaces of the moth-eye films 12 and 13 is not necessarily has an even (flat) wavelength dispersion characteristic within the visible light range.

Figure 2:
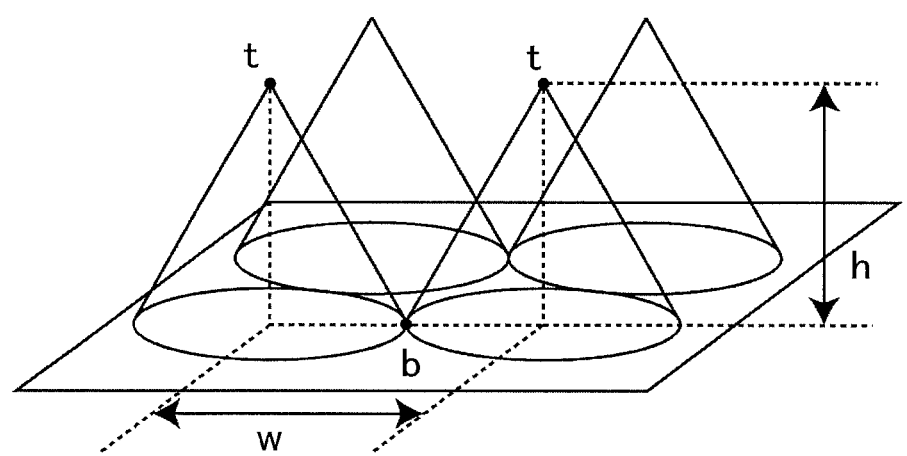
FIG. 2 is an enlarged perspective view of the surface of the moth-eye film of the structure with an observation port of Embodiment 1, wherein the unit structure of each protruding portion is a conical shape.
Figure 3:
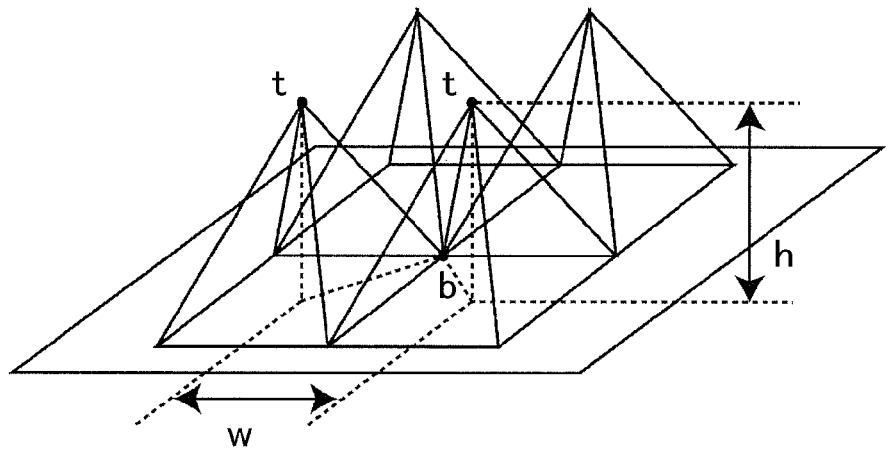
FIG. 3 is an enlarged perspective view of the surface of the moth-eye film of the structure with an observation port of Embodiment 1, wherein the unit structure of each protruding portion is a quadrangular pyramid shape.
Figure 4:
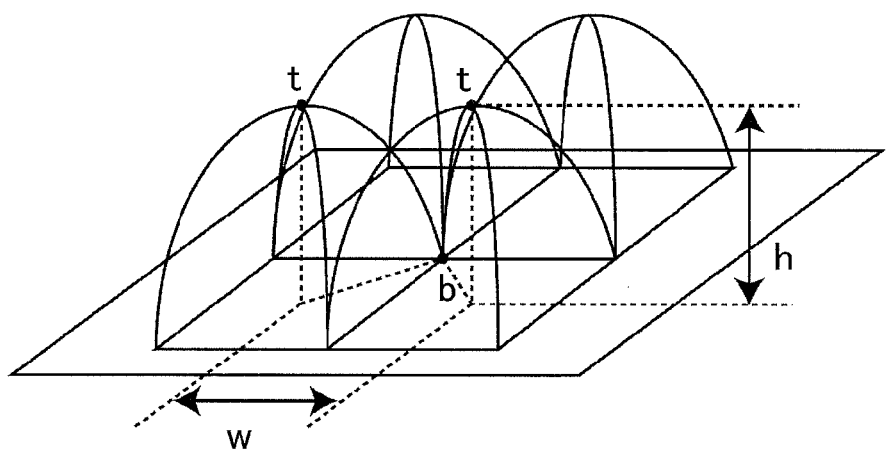
FIG. 4 is an enlarged perspective view of the surface of the moth-eye film of the structure with an observation port of Embodiment 1, wherein the unit structure of each protruding portion has a dome (bell) shape whose slope is rounded from the apex to the bottom point.
Figure 5:
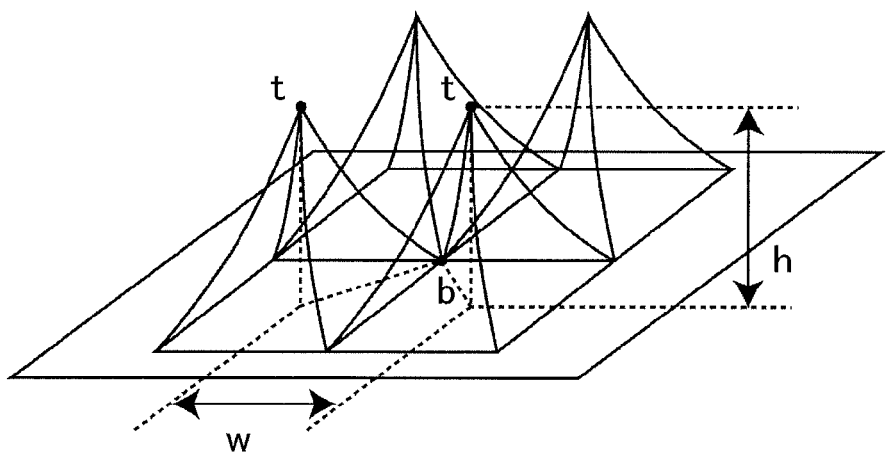
FIG. 5 is an enlarged perspective view of the surface of the moth-eye film of the structure with an observation port of Embodiment 1, wherein the unit structure of each protruding portion has a needle shape whose slope is steep from the apex to the bottom point.

The following will describe the shape of each protruding portion of the moth-eye films 12, 13, and 23 in detail. FIGS. 2 to 5 each are an enlarged perspective view of the surface of the moth-eye film of the structure with an observation port of Embodiment 1. FIG. 2 shows protruding portions with a conical unit structure; FIG. 3 shows protruding portions with a quadrangular-pyramid unit structure; FIG. 4 shows protruding portions with a dome (bell)-shaped unit structure wherein the slope is rounded from the apex to the bottom point; and FIG. 5 shows protruding portions with a needle-shaped unit structure wherein the slope is steep from the apex to the bottom point. As shown in FIGS. 2 to 5, the top portion of each protruding portion is an apex t and the point where protruding portions are in contact with each other is a bottom point b, in the moth-eye structure. As shown in FIGS. 2 to 5, the width w between the apexes of adjacent protruding portions of the moth-eye structure is represented by the distance between two points which are the feet of the perpendicular lines drawn from the apexes t of the protruding portions to the same plane. Further, the height h from the apex to the bottom point of the moth-eye structure is represented by the distance of the perpendicular line drawn from the apex t of the protruding portion to the plane where the bottom point b thereof exists. In other words, the aspect ratio of each protruding portion is represented by h/w which means that the height is divided by the pitch (the distance between the apexes).

In the moth-eye films 12, 13, and 23, the width w of the apexes of adjacent protruding portions is 380 nm or smaller, preferably 300 nm or smaller, and more preferably 200 nm or smaller. Although FIGS. 2 to 5 exemplify a conical shape, quadrangular pyramid shape, dome (bell) shape, and needle shape as the unit-structure shape of the protruding portions, the unit structure of the moth-eye structure in Embodiment 1 is not particularly limited as long as apexes and bottom points are formed and the structure has irregularities with the pitch thereof controlled to not greater than the visible light wavelength. Alternatively, for example, the structure may have a stepwise shape wherein the slope of a cone has steps.

Figure 6:
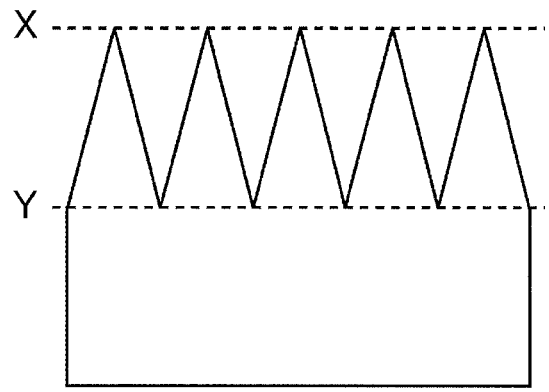
FIG. 6 is a schematic view showing the principle that a moth-eye film achieves low reflection, and showing the cross-sectional structure of the moth-eye film.
Figure 7:
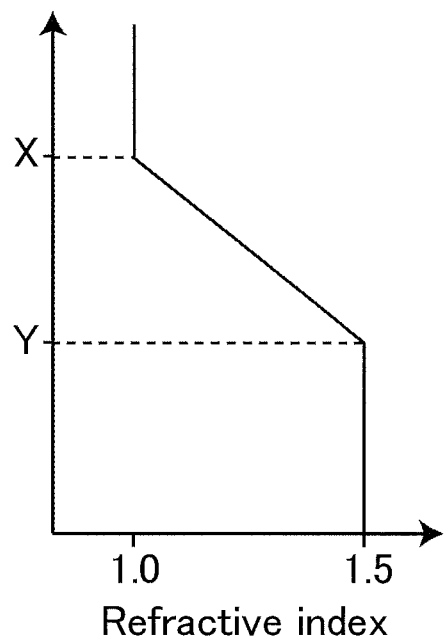
FIG. 7 is a schematic view showing the principle that a moth-eye film achieves low reflection, and showing the refractive index of the light incident on the moth-eye film.

Here is described the principle that the moth-eye film achieves low reflection. FIG. 6 and FIG. 7 each are a schematic view showing the principle that the moth-eye film achieves low reflection. FIG. 6 shows the cross-sectional structure of the moth-eye film and FIG. 7 shows the refractive index of the light incident on the moth-eye film. When moving from one medium to another medium, light is refracted, passes through, and is reflected at the interface between these media. The degrees of refraction and the like depend on the refractive index of the medium through which light passes. For example, the air has a refractive index of about 1.0 and a resin has that of about 1.5. In Embodiment 1, the unit structure of the uneven structure formed on the surface of the moth-eye film has a conical shape, in other words, a shape gradually tapered toward the tip direction, as a whole. Thus, as shown in FIG. 7, the refractive index can be considered to gradually and continuously increase from about 1.0, which is the refractive index of the air, to the refractive index of the film constituent material (about 1.5 in the case of resin) in the protruding portion (between X to Y) at the interface between the air layer and the moth-eye film. The amount of reflected light depends on the refractive index difference between the media. Thus, pseudo-cancellation of the refractive interface of light allows most part of the light to pass through the moth-eye film, and greatly decreases the reflectance on the film surface.

Evaluation Test 1

Figure 8:
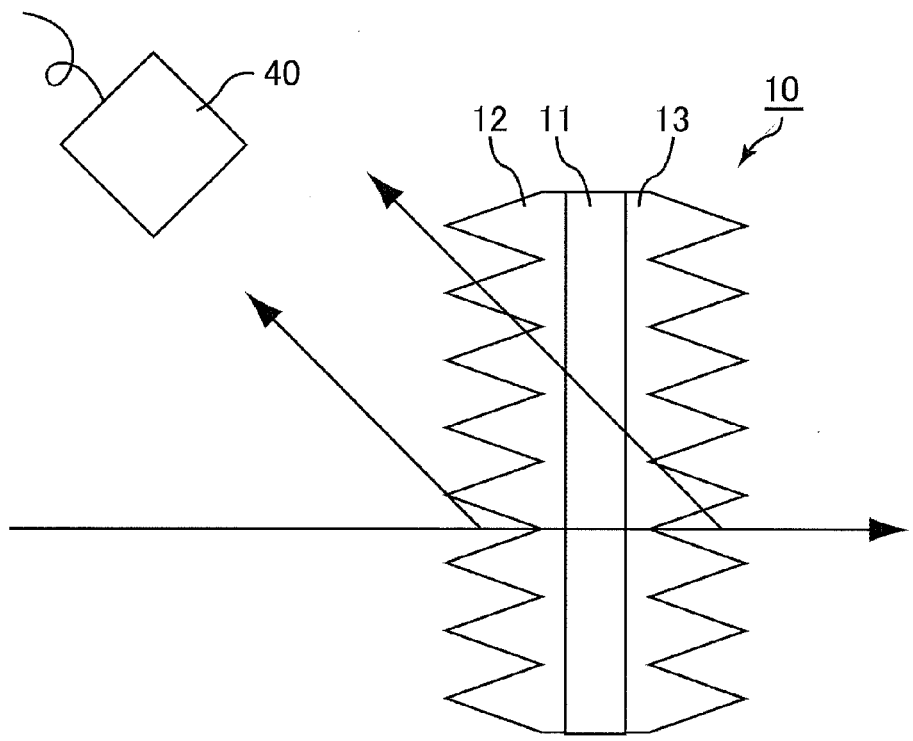
FIG. 8 is a schematic diagram showing the measurement of the reflectance of a tabular member comprising a transparent acryl plate (substrate) and moth-eye films placed on the respective faces of the transparent acryl plate.

In the following, tabular members each comprising moth-eye films on the respective faces of Example 1, Comparative Example 1, and Comparative Example 2 were actually produced as specific examples of Embodiment 1, and the results of measuring the reflectances thereof were shown. The reflectance obtained by combining reflection from both faces in each tabular member was measured using a UV-Vis spectrophotometer V-560 (JASCO Corporation). FIG. 8 is a schematic diagram showing the measurement of the reflectance of the tabular member comprising a transparent acryl plate (substrate) and moth-eye films placed on the respective faces of the transparent acryl plate. In the measurement, the reflection spectrum of 5° regular reflection light was measured with a halogen lamp as a light source and a detector 40.

The following will describe the method for producing each of the moth-eye films used in the tabular members of Example 1, Comparative Example 1, and Comparative Example 2. Here, five moth-eye films were produced under different conditions (Condition 1 to Condition 5).

First, a 10-cm-square glass substrate was prepared, and aluminum (Al), as a material of a mold, was deposited on the glass substrate at a thickness of 1.0 µm by sputtering. Next, the aluminum was anodized, and then immediately etched. These steps were repeated, and thereby an anodized layer was formed. Here, the anodized layer has a large number of fine depressed portions, and the distance between the bottom points of adjacent depressed portions is not greater than the visible light wavelength. Specifically, anodization, etching, anodization, etching, anodization, etching, anodization, etching, and anodization were performed in this order, and this flow (anodization: 5 times, etching: 4 times) provided a mold. Such repeated steps of anodization and etching give each of the fine depressed portions to be formed a tapered shape toward the inside of the mold.

The anodization was performed under the following conditions: 0.6 wt % oxalic acid; liquid temperature of 5° C.; and applied voltage of 80 V. The anodization time was different in each example. Adjustment of the anodization time causes difference in the size of each depressed portion to be formed. The relationship between the anodization time and the size of each depressed portion of the mold will be specifically described referring to the following Table 1. The etching was performed under the following conditions: 1 mol/l phosphoric acid, liquid temperature of 30° C.; and 25 minutes.

A 2P (photo-polymerizable) resin solution was dropped on the surface of each mold produced through the above production step and having depressed portions whose depth is different from that of the depressed portions of other molds. Then, a TAC film was carefully attached to a 2P resin layer consisting of the 2P resin solution using a roller so as not to contain air bubbles. Next, the 2P resin layer was irradiated with ultraviolet (UV) light at 2 J/cm$^2$, so that the 2P resin layer was cured. Thereafter, a laminated film of the cured 2P resin film and the TAC film was peeled off.

Further, the depth of the mold, the height of the printed article, the pitch of the depressed portions of the mold, and the pitch of the protruding portions of the printed article were measured using a SEM (scanning electron microscope). The measurement showed that the pitch of the depressed portions of the mold, and the pitch of the protruding portions of the printed article each were about 180 nm. Each protruding portion had a conical shape.

TABLE 1

| | Anodization time (sec.) | Mold depth (nm) | Printed article height (nm) | Aspect ratio |
|---|---|---|---|---|
| Condition 1 | 15 | 231 | 143 | 0.79 |
| Condition 2 | 20 | 328 | 175 | 0.97 |
| Condition 3 | 25 | 387 | 219 | 1.22 |
| Condition 4 | 33 | 520 | 255 | 1.42 |
| Condition 5 | 38 | 600 | 373 | 2.07 |

Figure 9:
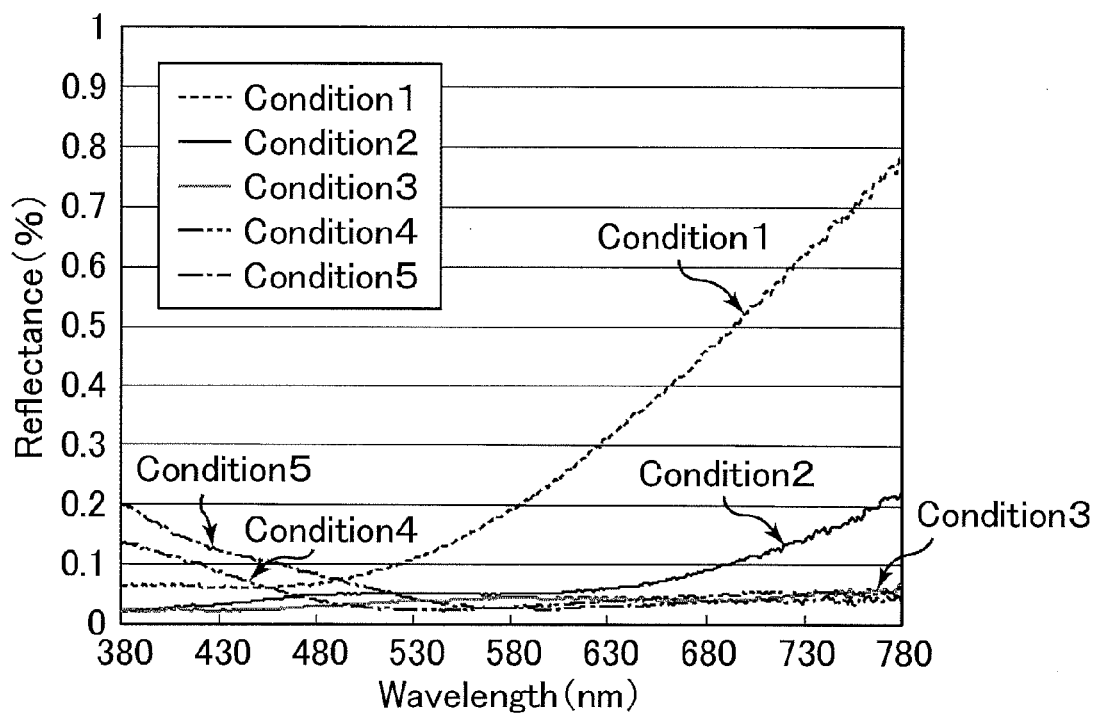
FIG. 9 is a graph showing the reflection spectra of light reflected from one face of a tabular member comprising a black acryl plate (substrate) and a moth-eye film (Conditions 1 to 5) placed on one face of the black acryl plate.

Here is illustrated a graph showing the wavelength dispersion characteristics of light reflected from one face of each of the moth-eye films of Conditions 1 to 5. In the measurement, the moth-eye film was attached on one face of a black acryl plate using a roller, and the reflection spectrum of light reflected from one face was measured under the same conditions as mentioned above using a UV-Vis spectrophotometer V-560 (JASCO Corporation). FIG. 9 is a graph showing the reflection spectra of light reflected from one face of the tabular member comprising a black acryl plate (substrate) and the moth-eye film (Conditions 1 to 5) placed on one face of the black acryl plate.

As shown in FIG. 9, in the case that the pitch was fixed to about 180 nm, the reflectance of wavelength components on the long wavelength side increases as the aspect ratio of each protruding portion of the moth-eye film decreases, and the reflectance of wavelength components on the short wavelength side increases as the aspect ratio of each protruding portion of the moth-eye film increases.

Figure 10:
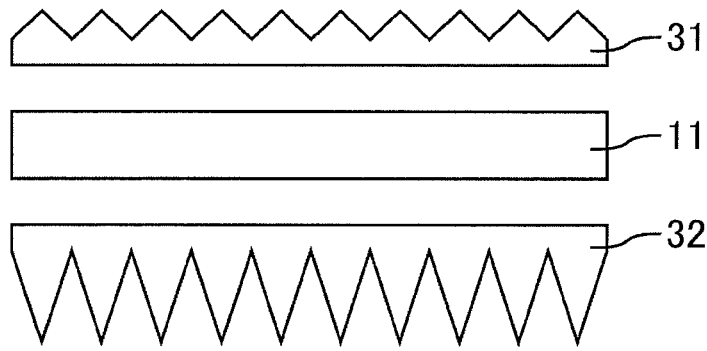
FIG. 10 is a schematic cross-sectional view of a tabular member of Example 1.

Then, the moth-eye film of Condition 2 was attached to one face of the transparent acryl plate as the outside moth-eye film of the tabular member of Example 1 and the moth-eye film of Condition 5 was attached to the other face of the transparent acryl plate. Thereby, the tabular member of Example 1 was completed. FIG. 10 is a schematic cross-sectional view of a tabular member of Example 1. As shown in FIG. 10, the tabular member of Example 1 comprises a substrate 11, a moth-eye film 31 of Condition 2, and a moth-eye film 32 of Condition 5.

Further, the moth-eye film of Condition 2 was attached to one face of the transparent acryl plate as the outside moth-eye film of the tabular member of Comparative Example 1 and the moth-eye film of Condition 2 was attached to the other face of the transparent acryl plate. Thereby, the tabular member of Comparative Example 1 was completed.

Furthermore, the moth-eye film of Condition 5 was attached to one face of the transparent acryl plate as the outside moth-eye film of the tabular member of Comparative Example 2 and the moth-eye film of Condition 5 was attached to the other face of the transparent acryl plate. Thereby, the tabular member of Comparative Example 2 was completed.

Figure 11:
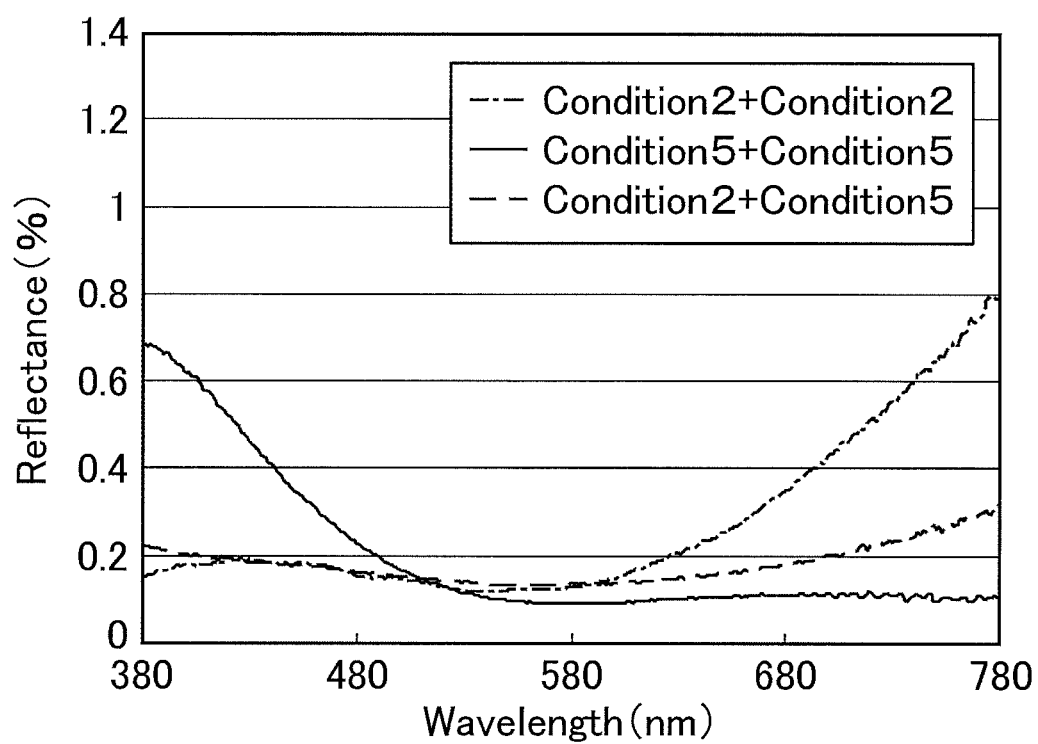
FIG. 11 is a graph showing the reflection spectra of light obtained by combining light beams reflected from both faces of a tabular member in each of Example 1, Comparative Example 1, and Comparative Example 2.

FIG. 11 is a graph showing the reflection spectra of light obtained by combining light reflected from both faces of each of the tabular members of Example 1, Comparative Example 1, and Comparative Example 2. As shown in FIG. 11, the wavelength dispersion characteristic of each tabular member is the same as that obtained by combining the wavelength dispersion characteristics each obtained in the case of attaching the moth-eye film on one face. In Comparative Example 1 and Comparative Example 2, the wavelength dispersion characteristics originally having a wide change range are combined to provide a wavelength dispersion characteristic having a wider change range.

The reflectance of total light reflected from both faces of the tabular member of Comparative Example 1 gradually increases from 380 nm, the lower limit of the visible light wavelength range, to 780 nm, the upper limit of the visible light wavelength range. The reflectance of the 380-nm wavelength component was about 0.1% while the reflectance of the 780-nm wavelength component was about 0.8%. The reflectance of the 550-nm wavelength component was about 0.1%.

Further, the reflectance of total light reflected from both faces of the tabular member of Comparative Example 2 gradually decreases from 380 nm, the lower limit of the visible light wavelength range, to 780 nm, the upper limit of the visible light wavelength range. The reflectance of the 380-nm wavelength component was about 0.7% while the reflectance of the 780-nm wavelength component was about 0.1%. The reflectance of the 550-nm wavelength component was about 0.1%.

In contrast, the reflectance of total light reflected from both faces of the tabular member of Example 1 was kept at about 0.2% from 380 nm, the lower limit of the visible light wavelength range, to 780 nm, the upper limit of the visible light wavelength range. The error within the visible light wavelength range around the reflectance of the 550-nm wavelength component showed less than 0.2% of the even (flat) wavelength dispersion characteristic.

In addition, the object colors of the respective samples, that is, the tabular members of Example 1, Comparative Example 1, and Comparative Example 2, were defined using standard illuminant $D_{65}$ as a light source and based on the transmissivity characteristics of the standard illuminant $D_{65}$ with respect to the weighting coefficients of the XYZ color system. Then, the Y value, x and y values, and a* and b* values of the reflected light were measured using a spectrophotometer CM-2600d (Konica Minolta Sensing, Inc.). Further, the color tone of each tabular member was visually observed. In the production of the tabular members, the conditions were adjusted based on the standard illuminant $D_{65}$ as a reference. Table 2 shows the measurement results.

TABLE 2

| | Example 1 | Comparative Example 1 | Comparative Example 2 | $D_{65}$ (Reference) |
|---|---|---|---|---|
| Y value | 0.1412 | 0.1403 | 0.1157 | 100 |
| x | 0.2942 | 0.3149 | 0.2226 | 0.3127 |
| y | 0.2851 | 0.2753 | 0.1733 | 0.329 |
| a* | 0.286 | 0.91 | 1.398 | 0.005569 |
| b* | −0.546 | −0.566 | −3.514 | 0.000706 |

TABLE 2-continued

|  | Example 1 | Comparative Example 1 | Comparative Example 2 | $D_{65}$ (Reference) |
|---|---|---|---|---|
| Color tone (visual observation) | Achromatic | Light red | Blue | N.A. |
| Comprehensive evaluation | + | – | – | N.A. |

As shown in Table 2, coloring was observed in Comparative Example 1 and Comparative Example 2 wherein the characteristic had a change range of 0.5% or higher around the transmissivity at a wavelength of 550 nm, whereas an achromatic color was achieved in Example 1 wherein the characteristic had a change range of lower than 0.2% within the visible light range around the transmissivity at a wavelength of 550 nm.

Here, the reflectance of the tabular member prepared without placing moth-eye films on the respective faces of the substrate was measured and it was about 4% at each face, and this tabular member was found to have a reflectance of about 8% in total of both faces. In contrast, the reflectance at both faces of the tabular member with moth-eye films placed on the respective faces as mentioned above was measured and it was about 0.1 to 0.2%. Thus, the reflectance was highly improved.

Evaluation Test 2

In the following, tabular members each comprising moth-eye films on the respective faces of Example 2, Example 3, and Example 4 were actually produced as other specific examples of Embodiment 1, and the results of measuring the reflectances thereof were shown. The reflectance obtained by combining reflection from both faces in each tabular member was measured using a UV-Vis spectrophotometer V-560 (JASCO Corporation) under the same conditions as in Evaluation Test 1.

The following will describe the method for producing each of the moth-eye films used in the tabular members of the examples. In addition to the moth-eye films of Conditions 1 to 5 used in Evaluation Test 1, three other moth-eye films (Condition 6 to Condition 8) were further produced under different producing conditions.

First, a 10-cm-square glass substrate was prepared, and aluminum (Al), as a material of a mold, was deposited on the glass substrate at a thickness of 1.0 μm by sputtering. Next, the aluminum was anodized, and then immediately etched. These steps were repeated, and thereby an anodized layer was formed. Here, the anodized layer has a large number of fine depressed portions, and the distance between the bottom points of adjacent depressed portions is not greater than the visible light wavelength. Specifically, anodization, etching, anodization, etching, anodization, etching, anodization, etching, and anodization were performed in this order, and this flow (anodization: 5 times, etching: 4 times) provided a mold. Such repeated steps of anodization and etching give each of the fine depressed portions to be formed a tapered shape toward the inside of the mold.

The anodization was performed under the following conditions: 2.0 wt % tartaric acid; liquid temperature of 5° C.; and applied voltage of 200 V. The anodization time was different in each example. Adjustment of the anodization time causes difference in the size of each depressed portion to be formed. The relationship between the anodization time and the size of each depressed portion of the mold will be specifically described referring to the following Table 3. The etching was performed under the following conditions: 1 mol/l phosphoric acid, liquid temperature of 30° C.; and 90 minutes.

A 2P (photo-polymerizable) resin solution was dropped on the surface of each mold produced through the above production step and having depressed portions whose irregularity height is different from that of the depressed portions of other molds. Then, a TAC film was carefully attached to a 2P resin layer consisting of the 2P resin solution using a roller so as not to contain air bubbles. Next, the 2P resin layer was irradiated with ultraviolet (UV) light at 2 J/cm², so that the 2P resin layer was cured. Thereafter, a laminated film of the cured 2P resin film and the TAC film was peeled off.

Further, the depth of the mold, the height of the printed article, the pitch of the depressed portions of the mold, and the pitch of the protruding portions of the printed article were measured using a SEM (scanning electron microscope). Each protruding portion had a conical shape. The measurement showed that the pitch of the depressed portions of the mold, and the pitch of the protruding portions of the printed article each were about 400 nm. Each protruding portion had a conical shape.

TABLE 3

| | Anodization time (sec.) | Mold depth (nm) | Printed article height (nm) | Aspect ratio |
|---|---|---|---|---|
| Condition 6 | 30 | 380 | 228 | 0.57 |
| Condition 7 | 60 | 504 | 302 | 0.76 |
| Condition 8 | 120 | 700 | 420 | 1.05 |

Figure 12:
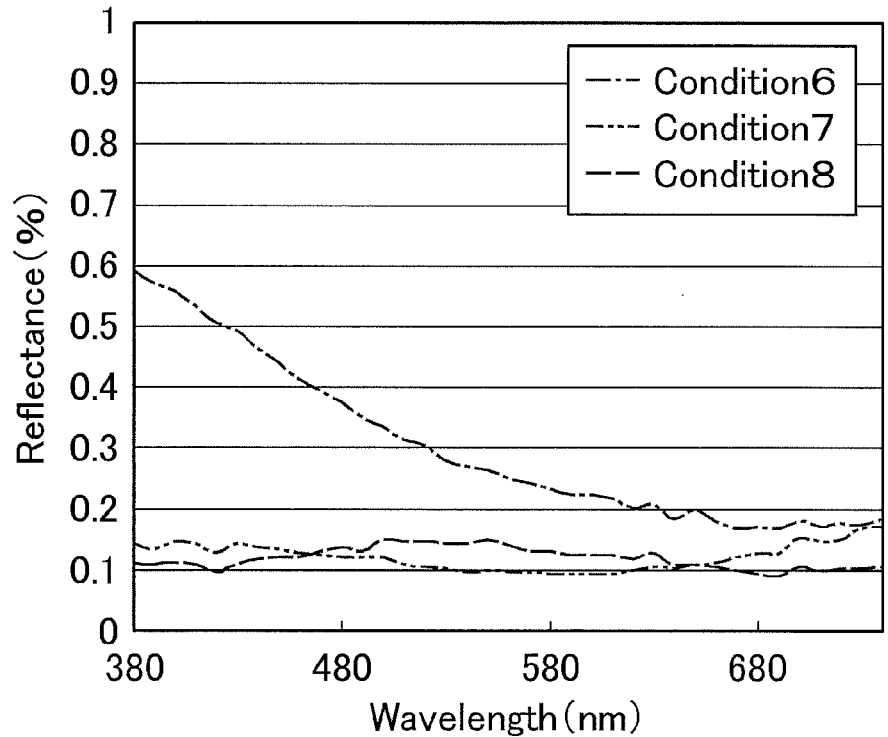
FIG. 12 is a graph showing the reflection spectra of light reflected from one face of a tabular member comprising a black acryl plate (substrate) and a moth-eye film (Conditions 6 to 8) placed on the black acryl plate.

Here is illustrated a graph showing the wavelength dispersion characteristics of light reflected from one face of each of the moth-eye films of Conditions 6 to 8. The moth-eye film was attached on one face of a black acryl plate using a roller, and the reflection spectrum of light reflected from one face was measured under the same conditions as mentioned above using a UV-Vis spectrophotometer V-560 (JASCO Corporation). FIG. 12 is a graph showing the reflection spectra of light reflected from one face of the tabular member comprising a black acryl plate (substrate) and the moth-eye film (Conditions 6 to 8) placed on one face of the black acryl plate.

As shown in FIG. 12, in the case that the pitch was fixed to about 400 nm, the reflectance of wavelength components on the short wavelength side increases as the aspect ratio of each protruding portion of the moth-eye film decreases, and the reflectance of wavelength components on the long wavelength side increases as the aspect ratio of each protruding portion of the moth-eye film increases.

Figure 13:
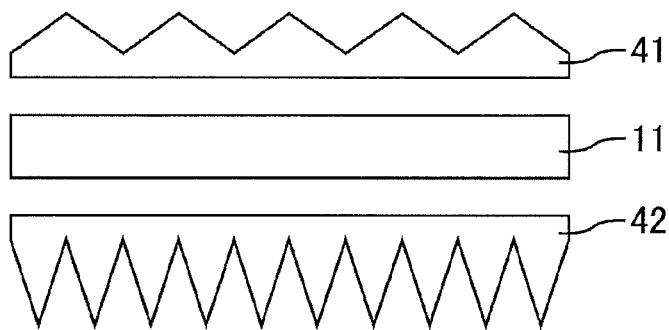
FIG. 13 is a schematic cross-sectional view of a tabular member of Example 2.

Then, the moth-eye film of Condition 7 was attached to one face of the transparent acryl plate as the outside moth-eye films of the tabular member of Example 2 and the moth-eye film of Condition 5 was attached to the other face of the transparent acryl plate. Thereby, the tabular member of Example 2 was completed. FIG. 13 is a schematic cross-sectional view of a tabular member of Example 2. As shown in FIG. 13, the tabular member of Example 1 comprises a substrate 11, a moth-eye film 41 of Condition 7, and a moth-eye film 42 of Condition 5.

Figure 14:
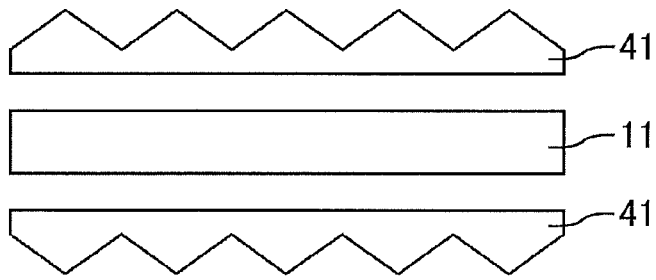
FIG. 14 is a schematic cross-sectional view of a tabular member of Example 3.

Further, the moth-eye film of Condition 7 was attached to one face of the transparent acryl plate as the outside moth-eye films of the tabular member of Example 3 and the moth-eye film of Condition 7 was attached to the other face of the transparent acryl plate. Thereby, the tabular member of Example 3 was completed. FIG. 14 is a cross-sectional view of the tabular member of Example 3. As shown in FIG. 14, the tabular member of Example 1 comprises a substrate 11, the moth-eye film 41 of Condition 7, and the moth-eye film 41 of Condition 7.

Figure 15:
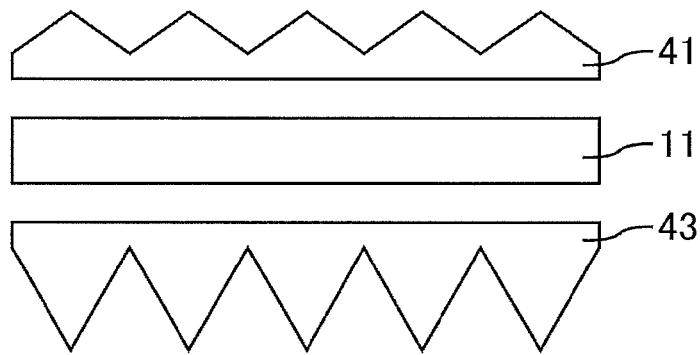
FIG. 15 is a schematic cross-sectional view of a tabular member of Example 4.

Furthermore, the moth-eye film of Condition 7 was attached to one face of the transparent acryl plate as the outside moth-eye films of the tabular member of Example 4 and the moth-eye film of Condition 8 was attached to the other face of the transparent acryl plate. Thereby, the tabular member of Example 4 was completed. FIG. 15 is a cross-sectional view of the tabular member of Example 4. As shown in FIG. 15, the tabular member of Example 1 comprises a substrate 11, the moth-eye film 41 of Condition 7, and the moth-eye film 43 of Condition 8.

Figure 16:
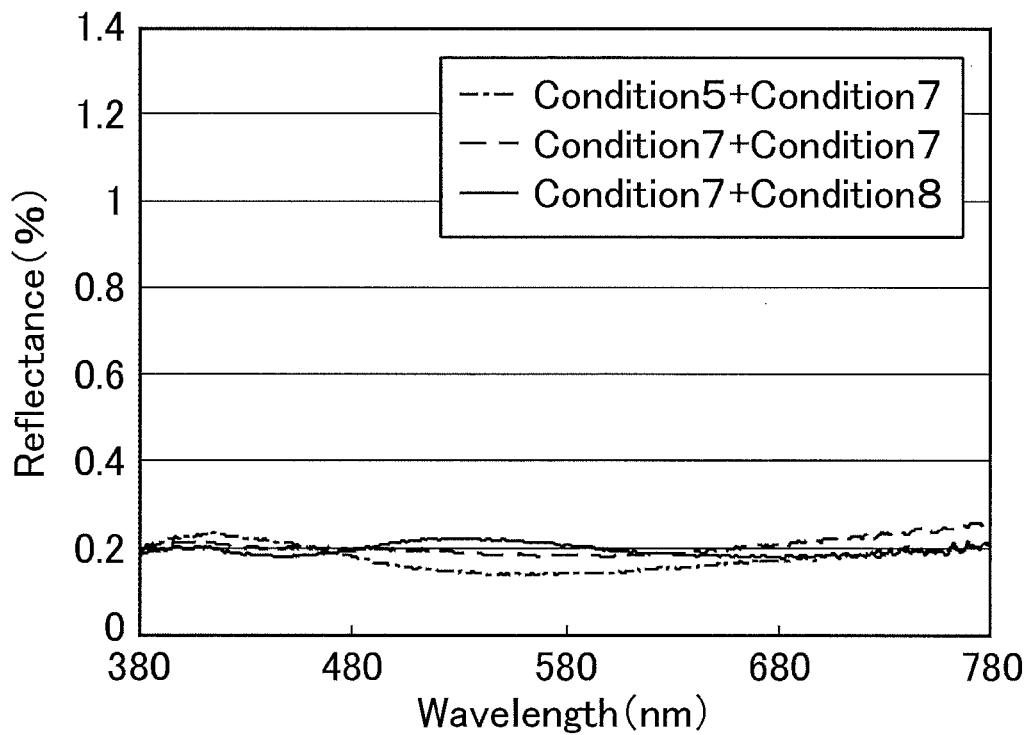
FIG. 16 is a graph showing the wavelength dispersion characteristics of light reflected from both faces of a tabular member of each of Example 2, Example 3, and Example 4.
Figure 17:
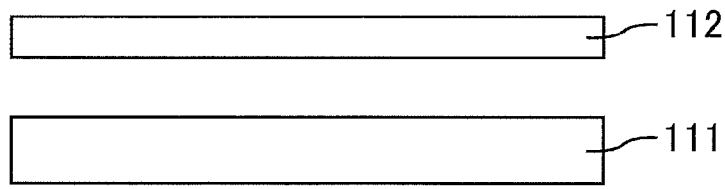
FIG. 17 is a schematic cross-sectional view showing one example of a tabular member formed by placing an anti-reflection film on a substrate, wherein an AR film or LR film is placed on the substrate.
Figure 18:
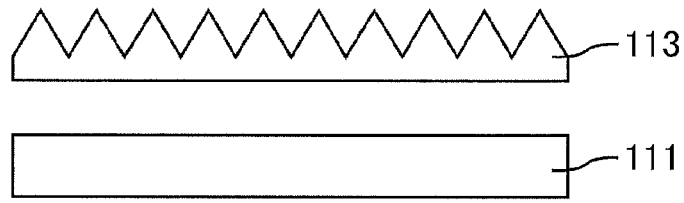
FIG. 18 is a schematic cross-sectional view showing one example of a tabular member formed by placing an anti-reflection film on a substrate, wherein a moth-eye film is placed on the substrate.
Figure 19:
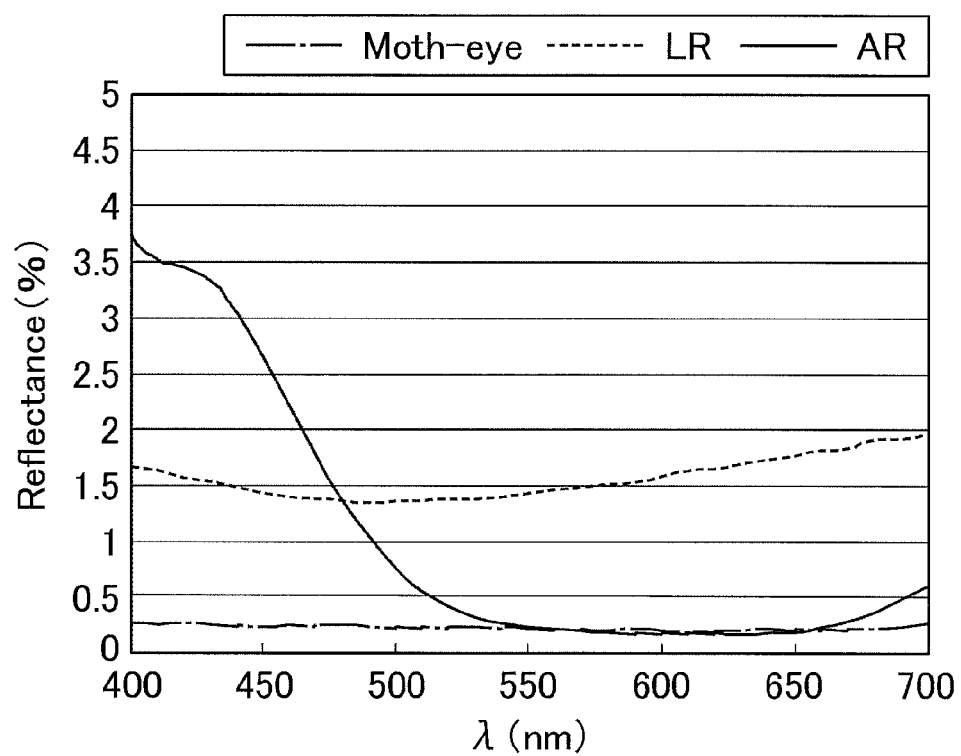
FIG. 19 is a graph showing the reflection spectra wherein the reflectances of an AR film, LR film, and moth-eye film are compared.
Figure 20:
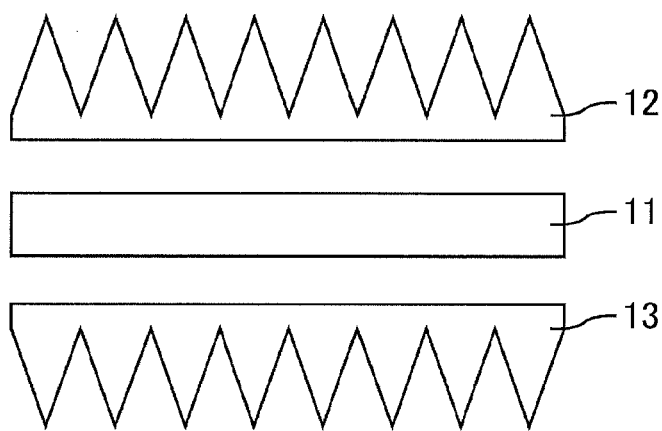
FIG. 20 is a schematic cross-sectional view showing one example of a tabular member formed by placing moth-eye films on the respective faces of a substrate.

FIG. 16 is a graph showing the wavelength dispersion characteristics of light reflected from both faces of each of the tabular members of Examples 2, 3, and 4. As shown in FIG. 16, the wavelength dispersion characteristics of each tabular member is the same as that obtained by combining the wavelength dispersion characteristics each obtained in the case of attaching the moth-eye film on one face.

The reflectance of total light reflected from both faces of the tabular member of Example 2 was kept at 0.2% from 380 nm, the lower limit of the visible light wavelength range, to 780 nm, the upper limit of the visible light wavelength range. The error within the visible light wavelength range around the reflectance of the 550-nm wavelength component showed less than 0.2% of the even (flat) wavelength dispersion characteristic.

The reflectance of total light reflected from both faces of the tabular member of Example 3 was kept at 0.2% from 380 nm, the lower limit of the visible light wavelength range, to 780 nm, the upper limit of the visible light wavelength range. The error within the visible light wavelength range around the reflectance of the 550-nm wavelength component showed less than 0.2% of the even (flat) wavelength dispersion characteristic.

The reflectance of total light reflected from both faces of the tabular member of Example 4 was kept at 0.2% from 380 nm, the lower limit of the visible light wavelength range, to 780 nm, the upper limit of the visible light wavelength range. The error within the visible light wavelength range around the reflectance of the 550-nm wavelength component showed less than 0.2% of the even (flat) wavelength dispersion characteristic.

In addition, the object colors of the respective samples, that is, the tabular members of Example 2, Example 3, and Example 4, were defined using standard illuminant $D_{65}$ as a light source and based on the transmissivity characteristics of the standard illuminant $D_{65}$ with respect to the weighting coefficients of the XYZ color system. Then, the Y value, x and y values, and a* and b* values of the reflected light were measured using a spectrophotometer CM-2600d (Konica Minolta Sensing, Inc.). Further, the color tone of each tabular member was visually observed. In the production of the tabular members, the conditions were adjusted based on the standard illuminant $D_{65}$ as a reference. Table 4 shows the measurement results.

TABLE 4

|  | Example 2 | Example 3 | Example 4 |
| --- | --- | --- | --- |
| Y value | 0.148 | 0.1876 | 0.2088 |
| x | 0.2867 | 0.3038 | 0.3101 |
| y | 0.272 | 0.308 | 0.3344 |
| a* | 0.432 | 0.041 | −0.444 |
| b* | −0.858 | −0.192 | 0.328 |

TABLE 4-continued

|  | Example 2 | Example 3 | Example 4 |
| --- | --- | --- | --- |
| Color tone (visual observation) | Achromatic | Achromatic | Achromatic |
| Comprehensive evaluation | + | + | + |

As shown in Table 4, an achromatic color was achieved in Example 2, Example 3, and Example 4.

Any combination of the moth-eye films among the aforementioned moth-eye films of Condition 1 to Condition 8 may be available in embodiments of the present invention.

The present application claims priority to Patent Application No. 2009-182776 filed in Japan on Aug. 5, 2009 under the Paris Convention and provisions of national law in a designated State, the entire contents of which are hereby incorporated by reference.

EXPLANATION OF SYMBOLS

10: tabular member
11, 111: substrate
12, 13, 23, 31, 32, 41, 42, 43, 113: moth-eye film
20: display body
21: liquid crystal display panel
22: polarizer
40: detector
112: AR film or LR film

The invention claimed is:

1. A tabular member, comprising:
a substrate;
a first anti-reflection film placed on one face of the substrate; and
a second anti-reflection film placed on the other face of the substrate,
the first anti-reflection film and the second anti-reflection film each comprising multiple protruding portions on their surfaces,
a width between apexes of adjacent protruding portions being not greater than a visible light wavelength,
light obtainable by combining light reflected from the surface of the first anti-reflection film and light reflected from the surface of the second anti-reflection film having flat wavelength dispersion within a visible light range, and
the flat wavelength dispersion being flatter than the wavelength dispersion of each of the light reflected from the surface of the first anti-reflection film and the light reflected from the surface of the second anti-reflection film.

2. The tabular member according to claim 1,
wherein each of the protruding portions of the first anti-reflection film is lower than each of the protruding portions of the second anti-reflection film.

3. The tabular member according to claim 1,
wherein each of the protruding portions of the first anti-reflection film has an aspect ratio of 0.5 or greater.

4. The tabular member according to claim 1,
wherein each of the protruding portions of the first anti-reflection film has an aspect ratio of smaller than 1.

5. The tabular member according to claim 1,
wherein each of the protruding portions of the first anti-reflection film is 100 nm or higher in height.

6. The tabular member according to claim 1,
wherein each of the protruding portions of the first anti-reflection film is lower than 200 nm in height.

7. The tabular member according to claim 1,
wherein each of the protruding portions of the second anti-reflection film has an aspect ratio of 1 or greater.

8. The tabular member according to claim 1,
wherein each of the protruding portions of the second anti-reflection film has an aspect ratio of smaller than 2.

9. The tabular member according to claim 1,
wherein each of the protruding portions of the second anti-reflection film is 200 nm or higher in height.

10. The tabular member according to claim 1,
wherein each of the protruding portions of the second anti-reflection film is lower than 400 nm in height.

11. A structure with an observation port, comprising, on its front face,
a tabular member comprising a substrate, a first anti-reflection film placed on one face of the substrate, and a second anti-reflection film placed on the other face of the substrate,
the first anti-reflection film and the second anti-reflection film each comprising multiple protruding portions on their surfaces,
a width between apexes of adjacent protruding portions being not greater than a visible light wavelength,
the first anti-reflection film being disposed on an outer side of the tabular member and the second anti-reflection film being disposed on the other side of the tabular member,
each of the protruding portions of the first anti-reflection film being lower than each of the protruding portions of the second anti-reflection film,
light obtainable by combining light reflected from the surface of the first anti-reflection film and light reflected from the surface of the second anti-reflection film having flat wavelength dispersion within a visible light range, and
the flat wavelength dispersion being flatter than the wavelength dispersion of each of the light reflected from the surface of the first anti-reflection film and the light reflected from the surface of the second anti-reflection film.

12. The structure with an observation port according to claim 11, further comprising, at an inner position of the structure with an observation port compared to the tabular member,
one or more inner anti-reflection films comprising multiple protruding portions on its surface,
a width between apexes of adjacent protruding portions being not greater than a visible light wavelength, and
light obtainable by combining light reflected from a surface of the first anti-reflection film, light reflected from a surface of the second anti-reflection film, and light reflected from a surface of the one or more inner anti-reflection films having flat wavelength dispersion within a visible light range.

13. The structure with an observation port according to claim 11,
wherein each of the protruding portions of the first anti-reflection film has an aspect ratio of 0.5 or greater.

14. The structure with an observation port according to claim 11,
wherein each of the protruding portions of the first anti-reflection film has an aspect ratio of smaller than 1.

15. The structure with an observation port according to claim 11,
wherein each of the protruding portions of the first anti-reflection film is 100 nm or higher in height.

16. The structure with an observation port according to claim 11,
wherein each of the protruding portions of the first anti-reflection film is lower than 200 nm in height.

17. The structure with an observation port according to claim 11,
wherein each of the protruding portions of the second anti-reflection film has an aspect ratio of 1 or greater.

18. The structure with an observation port according to claim 11,
wherein each of the protruding portions of the second anti-reflection film has an aspect ratio of smaller than 2.

19. The structure with an observation port according to claim 11,
wherein each of the protruding portions of the second anti-reflection film is 200 nm or higher in height.

20. The structure with an observation port according to claim 11,
wherein each of the protruding portions of the second anti-reflection film is lower than 400 nm in height.

21. A structure with an observation port, comprising:
a tabular member on its front face; and
one or more inner anti-reflection films at an inner position of the structure with an observation port compared to the tabular member,
the tabular member comprising a substrate, a first anti-reflection film placed on one face of the substrate, and a second anti-reflection film placed on the other face of the substrate,
the first anti-reflection film, the second anti-reflection film, and the one or more inner anti-reflection films each comprising multiple protruding portions on their surfaces,
a width between apexes of adjacent protruding portions being not greater than a visible light wavelength,
the first anti-reflection film being disposed on an outer side of the tabular member and the second anti-reflection film being disposed on the other side of the tabular member,
light obtainable by combining light reflected from a surface of the first anti-reflection film, light reflected from a surface of the second anti-reflection film, and light reflected from a surface of the one or more inner anti-reflection films having flat wavelength dispersion within a visible light range, and
the flat wavelength dispersion being flatter than the wavelength dispersion of each of the light reflected from the surface of the first anti-reflection film, the light reflected from the surface of the second anti-reflection film, and the light reflected from the surface of the one or more inner anti-reflection films.

22. The structure with an observation port according to claim 21,
wherein each of the protruding portions of the first anti-reflection film is lower than each of the protruding portions of the second anti-reflection film.

* * * * *